United States Patent

Bailey

[54] METHOD OF CONTROLLING FUEL INJECTORS FOR IMPROVED EXHAUST GAS RECIRCULATION

[75] Inventor: Brett M. Bailey, Peoria, Ill.

[73] Assignee: Caterpillar Inc., Peopria, Ill.

[21] Appl. No.: 09/286,719

[22] Filed: Apr. 6, 1999

[51] Int. Cl.[7] ............................ F02M 25/07; F02B 47/08
[52] U.S. Cl. .................. 123/568.12; 123/443; 123/58.8; 123/568.11
[58] Field of Search .............................. 123/3, 58.8, 443, 123/568.11, 568.12, 568.17, 568.18, 568.21, 568.24, 568.26, 568.27, 568.28; 60/605.2

[11] Patent Number: 6,138,650
[45] Date of Patent: Oct. 31, 2000

[56] References Cited

U.S. PATENT DOCUMENTS

| | | | |
|---|---|---|---|
| 4,011,845 | 3/1977 | Mayer et al. | 123/568.15 |
| 4,108,114 | 8/1978 | Kosaka et al. | 123/3 |
| 4,131,095 | 12/1978 | Ouchi | 123/58.8 |
| 4,143,635 | 3/1979 | Iizuka et al. | 123/568.11 |
| 4,163,282 | 7/1979 | Yamada et al. | |
| 4,249,382 | 2/1981 | Evans et al. | 60/605.2 |
| 4,269,156 | 5/1981 | Drellishak | 123/478 |
| 4,274,381 | 6/1981 | Abo | 123/479 |
| 4,279,235 | 7/1981 | Flaig et al. | 123/568.21 |
| 4,291,760 | 9/1981 | Argvle et al. | 165/166 |
| 4,319,451 | 3/1982 | Tajima et al. | 60/274 |
| 4,321,892 | 3/1982 | Anger | 123/58.8 |
| 4,408,585 | 10/1983 | Stuckas | 123/676 |
| 4,561,403 | 12/1985 | Oyama et al. | 123/676 |
| 5,178,119 | 1/1993 | Gale | 123/568.12 |
| 5,309,886 | 5/1994 | Hitomi et al. | 123/568.12 |
| 5,517,976 | 5/1996 | Bachle et al. | 123/568.12 |
| 5,546,915 | 8/1996 | Isobe | 123/568.12 |
| 5,669,365 | 9/1997 | Gartner et al. | 123/568.12 |
| 5,894,726 | 4/1999 | Monnier | 123/568.11 |
| 5,987,884 | 11/1999 | Kibe et al. | 123/443 |
| 6,009,709 | 1/2000 | Bailey | 123/568.12 |

FOREIGN PATENT DOCUMENTS

WO 00/12884  3/2000  WIPO .

Primary Examiner—Willis R. Wolfe
Attorney, Agent, or Firm—Keith P. Roberson

[57] ABSTRACT

The present invention improves the operation of an exhaust gas recirculation system having a recirculation combustion chamber or group of combustion chambers dedicated to supplying recirculated gas. Once a sensed engine load is within a predefined range, a controller advances fuel injection into the recirculation combustion chamber to reduce formation of particulates. The reduction in particulates reduces fouling of an exhaust gas recirculation system.

11 Claims, 2 Drawing Sheets

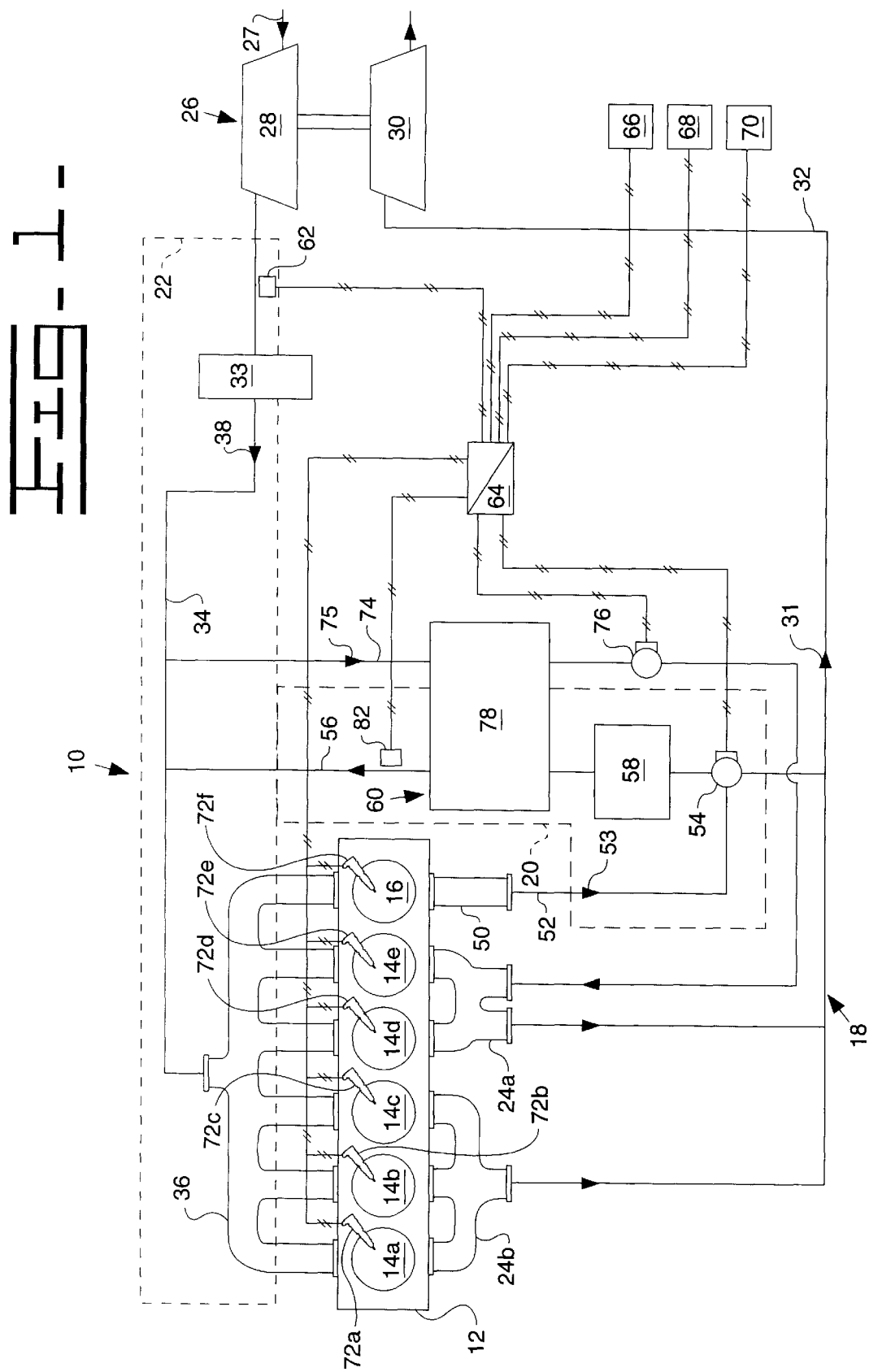

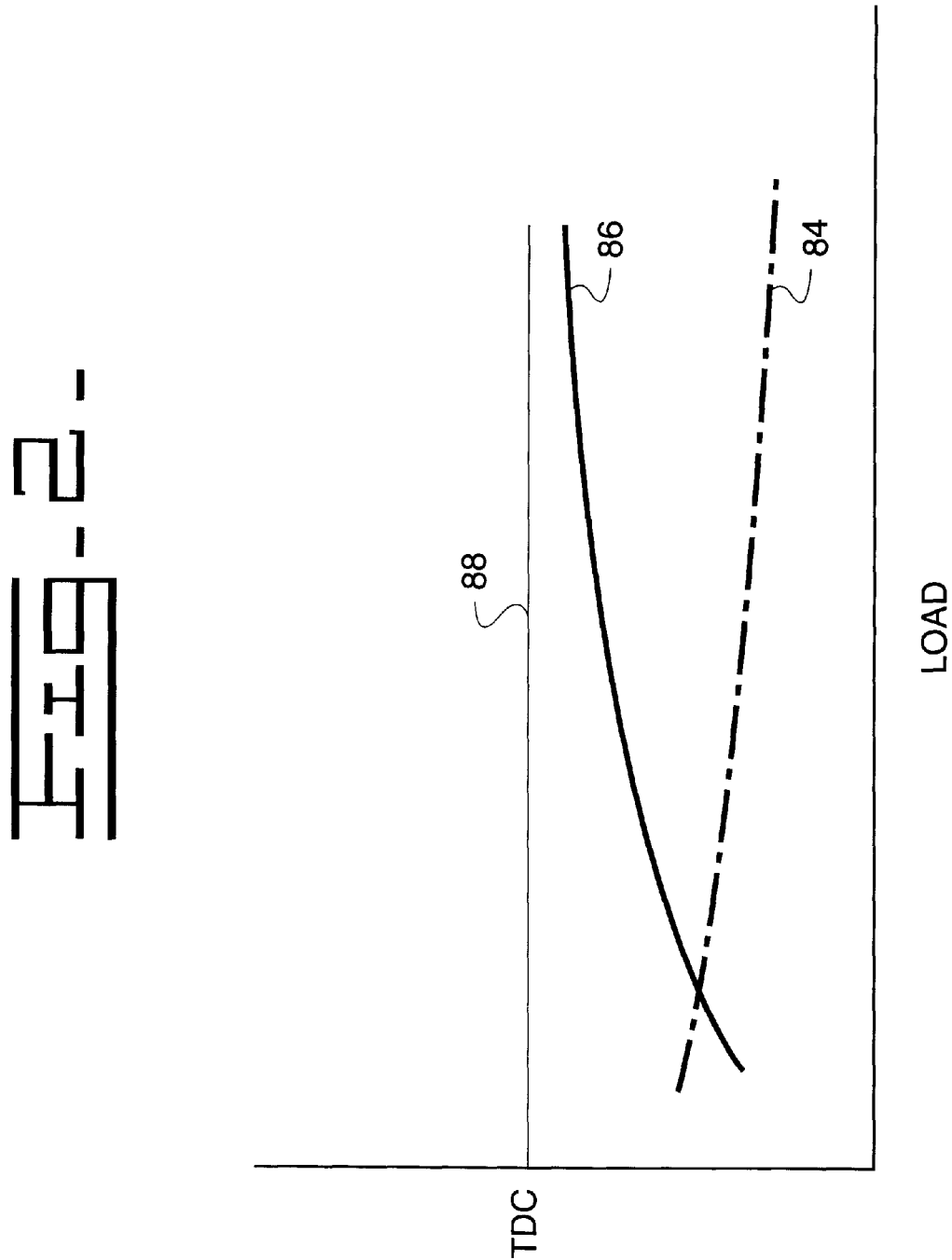

METHOD OF CONTROLLING FUEL INJECTORS FOR IMPROVED EXHAUST GAS RECIRCULATION

TECHNICAL FIELD

The present invention relates generally to an internal combustion engine and specifically to a method of controlling a fuel injection system to improve an exhaust gas recirculation system.

BACKGROUND ART

Future regulations on emissions require significantly reduced production of pollutants from an internal combustion engine. Engine manufacturers have responded by developing a number of systems directed at reducing pollutants. Regulated pollutants include unburned hydrocarbons, carbon monoxide, oxides of nitrogen (NOx), and particulates. Exhaust gas recirculation (EGR) is a system to reduce the formation of NOx.

In an exhaust gas recirculation system, exhaust gas replaces a portion of fresh air in an inlet air stream. Substituting exhaust gas for fresh air in the inlet air stream reduces a mass of excess oxygen in the inlet air stream. Excess oxygen is the mass of oxygen above that mass needed to create a stoichiometric mixture of air and fuel. Reducing excess oxygen in the combustion chamber slows a combustion process. A peak gas temperature in the combustion chamber decreases with the slower combustion process. High peak gas temperatures along with the excess oxygen in the combustion chamber are generally associated with the formation of NOx.

Some exhaust gas control systems further reduce NOx by retarding injection of a fuel into the combustion chamber. Retarding injection reduces a mixing time where the fuel and air are able to mix prior to the combustion process. The reduced mixing time in effects limits the excess oxygen in close proximity to the fuel. With less excess oxygen available to combust the fuel, the peak gas temperature in the combustion chamber decreases. The combination of reduced excess oxygen and lower peak gas temperature reduces the production of NOx. However, the retarded fuel injection increases a production of particulates from the engine. Generally, particulates form during incomplete combustion. Incomplete combustion of the fuel may also reduce the efficiency of the engine.

The increased particulates tend to cause problems in an engine having an EGR system. Many EGR systems include a heat exchanger to reduce the temperature of exhaust gas being recirculated. Cooling the exhaust gas further reduces the production of NOx by further lowering the peak gas temperature. To maintain the effectiveness of the heat exchanger, the particulates must be removed from the exhaust gas prior to entering the heat exchanger. Particulates entering the heat exchanger will foul the heat exchanger. The fouling of the heat exchanger will result in less effective cooling. To maintain the proper cooling, the manufacturer may oversize the heat exchanger.

To reduce the fouling of the heat exchangers, many manufacturers include a particulate trap ahead of the heat exchanger. Particulate traps also are subject to fouling. Fouling may be avoided by creating larger passages. However, larger passages will likely lead to blockages forming in the heat exchanger. Many particulate traps increase a face area perpendicular to a recirculation flow. The increased area allows for smaller passages while retaining a flow area equivalent to a flow area in an upstream duct. To reduce maintenance, manufacturers may increase the face area in anticipation of a portion of the smaller passages being blocked. The expansion and contraction of the recirculation flow passing through the particulate trap creates a loss in pressure. For an exhaust gas recirculation system to work in a high load condition, pressure losses from the exhaust manifold through a recirculation conduit must be reduced.

The present invention is directed at overcoming one or more of the problems set forth above.

DISCLOSURE OF THE INVENTION

In one aspect of the present invention a method of operating an exhaust gas recirculation system for an internal combustion engine includes sensing an engine load condition. When the sensed engine load condition is above a predetermined range, exhaust gas from a first group of combustion chambers is directed to an exhaust gas recirculation system. Exhaust gas from a second group of combustion chambers is directed to an exhaust system. Fuel injection into the first group is advanced when the sensed engine load condition is above the predetermined range.

BRIEF DESCRIPTION OF THE DRAWINGS

FIG. 1 is a schematic drawing of an exhaust gas recirculation system embodying the present invention; and FIG. 2 shows a graph of fuel injection timing.

BEST MODE FOR CARRYING OUT THE INVENTION

The schematic in FIG. 1 has as its base an internal combustion engine 10. In this application the engine 10 is made up of an engine block 12 having a first group of combustion chambers or five combustion chambers 14a, 14b, 14c, 14d, 14e, and a second group of combustion chambers or recirculation combustion chamber 16. Each combustion chamber 14a–e and recirculation combustion chamber 16 has a piston 17 slidably positioned therein. While this represents an inline six cylinder engine, this system would work as well with an inline or "V" engine having at least two combustion chambers. The combustion chambers 14a–e connect to an exhaust system 18. The recirculation combustion chamber 16 connects to an EGR system 20. The engine 10 also has an inlet system 22 connected to the combustion chambers 14a–e and recirculation combustion chamber 16.

The illustrated exhaust system 18 has a front exhaust manifold 24a and rear exhaust manifold 24b. Alternative engines may use a single exhaust manifold. Combustion chambers 14a–c connect to the rear exhaust manifold 24b and combustion chambers 14d–e connect to the front exhaust manifold 24a.

In this application, the engine 10 has a turbocharger 26 having a compressor 28 and a turbine 30. An exhaust conduit 32 carrying an exhaust flow 31 fluidly connects the exhaust manifolds 24a and 24b to an inlet of the turbine 30. An ambient air conduit 27 fluidly connects to an inlet of the compressor 28. An outlet of the compressor 28 fluidly connects to an air-to-air after cooler (ATAC) 33. While in this application an air-to-air after cooler 33 is shown, other similar heat exchanging apparatus including jacket water after cooler will provide the same function. An inlet conduit 34 fluidly connects the ATAC 33 to an inlet manifold 36. The inlet conduit 34 contains an inlet flow 38. Combustion chambers 14a–e and 16 are fluidly connected to the inlet manifold 36.

A recirculation manifold 50 fluidly connects to the recirculation combustion chamber 16. The recirculation manifold 50 is depicted as a separate manifold in FIG. 1. The recirculation manifold 50 may, also, be included as a part of the front exhaust manifold 24*a* having a decreased volume passage in the proximity of the recirculation combustion chamber 16 and a separate outlet as part thereof being fluidly connected to a recirculation conduit 52. The recirculation conduit 52 carries a recirculation flow 53. The latter mode reduces the number of parts, cost, and complexity and therefore is the best mode. In either case, the volume of the front exhaust manifold 24*a* or recirculation manifold 50 should be configured so that a pressure pulse of the exhaust gas resulting in recirculation combustion chamber 16 is not significantly dissipated before entering the recirculation conduit 52. While this representation shows only one combustion chamber 16 fluidly connected to the recirculation manifold 50, more than one of the combustion chambers 14*a–e* could also be fluidly connected to the recirculation manifold 50.

The recirculation conduit 52 fluidly connects the recirculation manifold 50 to an optional EGR valve 54 being variably movable between a first position and a second position. In the first position, the EGR valve 54 fluidly connects the recirculation conduit 52 with a supply conduit 56. The inlet manifold 36 fluidly connects with the supply conduit 56. In the second position, the EGR valve 54 fluidly connects the recirculation manifold 50 with the front exhaust manifold 24*a*. When operatively positioned between the first and second position, the recirculation conduit 52 fluidly connects with both the supply conduit 56 and the front exhaust manifold 24*a*. A particulate trap 58 is located in the supply conduit 56 upstream of an EGR cooling system 60. The supply conduit 56 fluidly connects to the inlet conduit 34. However, the supply conduit 56 may connect to the inlet system 22 anywhere downstream of the turbocharger 26.

In this application, a pressure sensor 62 is operatively positioned in the inlet conduit 34. The pressure sensor 62 provides an input signal to a controller 64. This application shows an electronic controller, but a pneumatic or other conventional control device may also be used. The pressure sensor 62 in the inlet conduit 34 provides one manner of determining the load on the engine 10. Other conventional manners used to determine the load on the engine 10 include: an exhaust temperature sensor 65 operatively positioned in the exhaust system 18; a strain gauge operatively positioned on a work shaft; a sensor for measuring the composition of an exhaust gas; and other similar instruments. In addition or as a further alternative to the pressure sensor 62, the internal combustion engine 10 may have other sensors providing inputs into the electronic controller 64 including: an engine speed sensor 66, a fuel demand sensing device 68, and/or a fuel delivery sensing device 70. The electronic controller provides a signal to a plurality of fuel injectors 72*a–f* fluidly connected to the combustion chambers 14*a–e* and recirculation combustion chamber 16.

The EGR cooling system 60, as illustrated, includes a bleed conduit 74, an optional bleed valve 76, and an EGR heat exchanger 78. The bleed conduit 74 contains a bleed flow 75. The bleed conduit 74 fluidly connects to the inlet conduit 34 downstream of the air-to-air aftercooler 33. The bleed valve 76 moves between a bleed open position and a bleed closed position. In the bleed open position, the inlet conduit 34 fluidly connects to the front exhaust manifold 24*a*. However, the bleed conduit 74 could be fluidly connected to the exhaust system 18 anywhere upstream of the turbine inlet 44. In the bleed closed position, the inlet conduit 34 does not fluidly communicate with the exhaust manifold 24*a*. The bleed conduit 74 is connected to the EGR heat exchanger 78 in a manner to promote heat exchange from the bleed conduit 74 to the EGR heat exchanger 78. The supply conduit 56 is also connected to EGR heat exchanger 78 in a manner promoting heat exchange from the supply conduit 56 to the EGR heat exchanger 78. The electronic controller 64 sends an output signal to the bleed valve 76. In a similar manner, the controller 64 sends an output signal to the EGR valve 54. The recirculated flow 53 might also be cooled using a water jacket or other similar heat exchanging device. In this application, the EGR heat exchanger 78 is a recuperative type heat exchanger.

In operation, FIG. 2 shows a recirculation fuel injection curve 84 and a standard fuel injection curve 86. These curves 84, 86 are only meant to represent general trends of advancing and retarding at a set engine speed not actual control strategies. A top dead center line 88 shows a point where the combustion chamber 14*a–e*, 16 has reached its smallest volume in a compression stroke. The recirculation fuel curve 84 shows recirculation injection occurring further away from top dead center with increasing loads for a set speed N. The standard fuel injection curve 86 shows fuel injection closer to top dead center 88 as loads increase for the set speed N.

INDUSTRIAL APPLICABILITY

The EGR system 24 and method of operating the fuel injectors greatly reduces fouling of the EGR heat exchanger 78. Unlike existing systems, the fuel injectors 72 operate according to whether the recirculation combustion chamber 16 is emptying into the exhaust system 18 or the EGR system 20. This EGR system 20 allows for properly sizing of both the EGR heat exchanger 78 and the particulate trap 58.

Similar to operation of other diesel engines, inlet flow 38 is compressed by the turbocharger 26. Compression of the inlet flow 38 increases its temperature and in turn reduces the density of the air. The air-to-air aftercooler 33 cools the inlet flow to temperatures closer to ambient conditions. The EGR system 20 supplements the inlet flow 38 with a recirculation flow 53 during high load conditions.

Most conventional EGR systems 20 operate only in low and moderate load conditions. In conventional systems, the turbocharger 26 pressurizes the inlet flow 38 to pressures exceeding those in the exhaust manifold 24. Instead of using pressures in the exhaust manifold 24, this EGR system 20 uses the movement of the piston 17 in the recirculation combustion chamber 16 to drive recirculation flow 53 through the EGR system 20 into the inlet system 22.

By using exhaust gas from only the recirculation combustion chamber 16, the recirculation flow 53 may be especially tailored to meet different engine operating conditions. In this application, recirculation flow 53 needs to have low particulates. When the EGR valve 54 is not at the second position, the controller 64 will advance timing of fuel injection into the recirculation combustion chamber 16. By advancing fuel injection, fuel and air will mix more completely. Complete mixing will improve combustion and reduce production of particulates. More NOx may be produced in the recirculation combustion chamber 16, but exhaust gas from the recirculation chamber 16 goes to the inlet system 22 instead of the exhaust system 18. With fewer particulates, the particulate trap 58 may be designed to remove fewer particulates. Fewer particulates will allow for the EGR heat exchanger 78 to be sized with fewer accommodations for expected fouling and associated reduced heat transfer. The smaller particulate trap 58 will have less pressure loss due to expansion and contraction losses associated with larger particulate traps 58. Particulate traps 58 having smaller volumes will reduce damping of pressure waves. With fewer pressure losses and lags, the EGR system 20 will operate more responsively over larger engine operating ranges.

Position of the EGR valve 54 may be determined according to various inputs into the controller 64. Typically NOx forms at higher engine loads and higher engine speeds. Either the pressure sensor 62 or the exhaust temperature sensor 65 may be used to determine engine load. At higher engine loads, pressures in the inlet manifold 36 will increase above some predetermined pressure. Once the EGR valves 54 moves from the second position towards the first position, the controller 64 will advance fuel injection into the recirculation combustion chamber by some predetermined time ahead of top dead center.

Instead of using the pressure sensor 62, the exhaust temperature sensor 65 may be used with the controller 64 to move the EGR valve 54 from the second position after reaching some predetermined temperature. The temperature sensor 65 will prevent recirculation flow 53 both in high load conditions and during engine start-up.

In some instances recirculation flow 53 may only be desired during high load and high speed. The controller 64 may use additional inputs from the engine speed sensor 66 to prevent the EGR valve 54 from moving away from the second position until reaching both some predetermined temperature range and speed range. The controller may use the predetermined temperature of the exhaust flow 31 or predetermined pressure of the inlet flow 38 along with anyone or more of the following sensors: the engine speed sensor 66, the fuel demand sensing device 68, or fuel delivery sensing device 70.

Other aspects, objects and advantages of this invention can be obtained from a study of the drawings, the disclosure and the appended claims.

What is claimed is:

1. A method of operating an exhaust gas recirculation system for an internal combustion engine, comprising the steps of:
   determining an engine load condition;
   directing exhaust gas from a first group of combustion chambers to an exhaust gas recirculation system where said engine load condition being above a predetermined range, said first group being less than all of a plurality of combustion chambers of said engine;
   directing exhaust gas from a second group of combustion chambers to an exhaust system; and
   advancing injection of fuel into said first group where said engine load condition being above said predetermined range, said advancing being adapted to promote mixing of fuel and air.

2. The method of operating an exhaust gas recirculation system as specified in claim 1 wherein said directing exhaust from said first group being electronically actuating an exhaust gas recirculation valve intermediate said first group and an inlet manifold.

3. The method of operating an exhaust gas recirculation system as specified in claim 1 further comprising the step of retarding injection of fuel into said second group, said retarding being adapted to reduce production of NOx.

4. The method of operating an exhaust gas recirculation system as specified in claim 1 wherein said step of determining the engine load being sensing an inlet air pressure downstream of air compressing device.

5. The method of operating an exhaust gas recirculation system as specified in claim 1 further comprising cooling the exhaust gas from said first group.

6. The method of operating an exhaust gas recirculation system as specified in claim 5 wherein said cooling step being exchanging thermal energy between the exhaust gas and a cool air supply.

7. The method of operating an exhaust gas recirculation system as specified in claim 5 further comprising the step of filtering the exhaust gas from said first group.

8. The method of operating an exhaust gas recirculation system as specified in claim 7 wherein said filtering step being prior to said cooling step.

9. A method of operating an exhaust gas recirculation system for an internal combustion engine, comprising the steps of:
   determining an engine load;
   determining an engine speed;
   directing exhaust gas from a first group of combustion chambers to an exhaust gas recirculation system where said engine load being in a predetermined range and said engine speed being in a predetermined speed range, said first group being less than all of a plurality of combustion chambers of said engine;
   directing exhaust gas from a second group of combustion chambers to an exhaust system; and
   advancing injection of fuel into said first group where said engine load being in the predetermined range and said engine speed being within the predetermined speed range.

10. The method of operating an exhaust gas is recirculation system as specified in claim 9 wherein said step of determining an engine load being sensing a temperature in the exhaust system.

11. The method of operating an exhaust gas recirculation system as specified in claim 9 wherein said step of sensing an engine load being sensing a pressure in an inlet system.

* * * * *